(12) United States Patent
Roth et al.

(10) Patent No.: US 7,951,221 B2
(45) Date of Patent: May 31, 2011

(54) PROCESS FOR THE TREATMENT OF CONTAMINATED METAL RESIDUES AND APPARATUS FOR IMPLEMENTING IT

(75) Inventors: Jean-Luc Roth, Thionville (FR); Ludivine Piezanowski, Villerupt (FR); Marc Pelletier, Saint-Mande (FR); Alain Laudet, Namur (BE)

(73) Assignee: Paul Wurth S.A., Luxembourg (LU)

( * ) Notice: Subject to any disclaimer, the term of this patent is extended or adjusted under 35 U.S.C. 154(b) by 65 days.

(21) Appl. No.: 12/443,525

(22) PCT Filed: Sep. 25, 2007

(86) PCT No.: PCT/EP2007/060148
§ 371 (c)(1),
(2), (4) Date: Apr. 8, 2009

(87) PCT Pub. No.: WO2008/037703
PCT Pub. Date: Apr. 3, 2008

(65) Prior Publication Data
US 2010/0024598 A1    Feb. 4, 2010

(30) Foreign Application Priority Data
Sep. 29, 2006  (EP) .................................. 06121543

(51) Int. Cl.
*C22B 7/00*   (2006.01)
(52) U.S. Cl. ................. 75/401; 75/751; 75/961; 75/962
(58) Field of Classification Search .............. 75/401, 75/441, 766–768, 961, 962
See application file for complete search history.

(56) References Cited

U.S. PATENT DOCUMENTS

| | | | | |
|---|---|---|---|---|
| 4,326,883 A | * | 4/1982 | Schwarz | 75/750 |
| 4,528,029 A | * | 7/1985 | Goksel | 75/766 |
| 2005/0256359 A1 | | 11/2005 | Bolsing | |

FOREIGN PATENT DOCUMENTS

| | | |
|---|---|---|
| EP | 1645645 | 4/2006 |
| JP | 2000192155 | 7/2000 |
| JP | 2000237512 | 9/2000 |
| WO | 9909224 | 2/1999 |
| WO | 0017404 | 3/2000 |
| WO | 0066796 | 5/2000 |

OTHER PUBLICATIONS

International Search Report PCT/EP2007/060148; Dated Jan. 2, 2008.

* cited by examiner

*Primary Examiner* — George Wyszomierski
*Assistant Examiner* — Tima M McGuthry-Banks
(74) *Attorney, Agent, or Firm* — Cantor Colburn LLP

(57) ABSTRACT

Disclosed is a process and apparatus for the treatment of divided metal residues contaminated by one or more organic compounds, including mixing, inside a chamber, of metal residues with at least one calcium/magnesium compound capable of reacting exothermically with water; exothermic reaction of the at least one calcium/magnesium compound with the water that the metal residues contain; rise in temperature of the metal residues subject to an exothermic reaction; dehydration of the metal residues during this exothermic reaction; oxidation of the organic compounds during the mixing, by bringing the metal residues contaminated by one or more organic compounds mixed with the at least one calcium/magnesium compound into contact with a gas stream containing at least partly oxygen; and removal from the chamber of a handleable dehydrated treated product having a residual content of organic compounds of less than 1% by weight of the treated product.

11 Claims, 2 Drawing Sheets

PROCESS FOR THE TREATMENT OF CONTAMINATED METAL RESIDUES AND APPARATUS FOR IMPLEMENTING IT

TECHNICAL FIELD OF THE INVENTION

The present invention relates to a process for the treatment and utilization of divided metal residues contaminated by one or more organic compounds, particularly hydrocarbons. The invention also relates to the apparatus for implementing the process.

BRIEF SUMMARY OF RELATED ART

The expression "divided metal residues" is understood to mean a collection of solid dust, chips, lamellae, flakes and/or granules or the like, of a metallic nature. These metal residues are mainly in the form of elementary metal compounds and/or metal oxides, but they may also appear in particular in sulphur-containing or chlorinated forms or as a mixture of the aforementioned forms. These divided metal residues are generally by-products of the iron-and-steel industry or non-ferrous metals. One of the families of these divided metal residues consists of hot-rolling oxides, often referred to by the term "mill scale". Another family comprises grindings and/or turnings resulting from the machining of metal parts.

These divided metal residues generally posses a high weight content of metal, greater than 30%, frequently greater than 50% or even 70% which it is desirable to utilize, in particular in the industry that has generated them.

These divided metal residues are very frequently contaminated by one or more organic compounds, particularly hydrocarbons, the latter possibly representing up to about 20% of the total mass. They are therefore sometimes denoted by the term "fatty scale" and usually contain a variable amount of water, which may be more than 20% of the total mass, hence their destructured nature—rolling mill scale constitutes one particular case thereof.

The presence of organic compounds often makes it necessary to pre-treat these by-products before recycling them, especially for environmental reasons, it being possible for some of these organic compounds to be precursors of toxic compounds, such as volatile organic compounds (VOCs) and organochlorinated compounds, the most toxic ones of which are polychlorinated biphenyls (PCBs) dioxins and furans.

Direct recycling of these divided metal residues also poses another problem: because of the presence of organic compounds and water, the by-product cannot easily be handled—it is inhomogeneous, sticky and unstructured. This is particularly the case when it is attempted to recycle mill scale from the steel industry into the process for sintering ore for feeding blast furnaces. In this case, apart from the handling difficulty, hydrocarbon vapours are given off and these foul the gas circulation system, in particular the fans and filters. Moreover, the aforementioned organic compounds may be converted during recycling to toxic compounds—specific decontamination of the gases must be provided.

To meet the regulations relating to the discharging of the aforementioned toxic compounds, industrial practice shows that it is necessary to greatly limit the content of organic compounds in mill scale or other divided metal residues, during their recycling, owing to the limitations of methods for decontaminating the gases, especially as regards the filters.

It is known to treat oily mill scale by intimately mixing it with calcium oxide, mainly in the form of quick lime. In chapter 38 of a work on a recent review of the prior art in this field, the author (F. Bölsing, "Dispersing by Chemical Reactions Remediation Technology", in D. Wise et al., "Remediation engineering of contaminated soils", by Marcel Dekker Inc., 2000) proposes a treatment in two steps:

addition of quick lime to the medium contaminated by hydrocarbons, especially steel mill scale (predistribution step); and intensive mixing, possibly in a grinder, so as to produce a homogeneous dispersed medium and to allow oil to be transferred to the lime; quick lime CaO also picks up all or some of the water present in the mill scale, converting it to slaked lime $Ca(OH)_2$ (dispersion step).

The lime combined with the oil can then be easily separated from the iron and iron oxide particles, by screening. Magnetic separation may also allow the finest metal particles to be recovered.

The author also points out that it is often necessary to pre-treat the quick lime by means of an additive that slows down the reaction of slaking the lime with the water from the mill scale, otherwise this very rapid slaking reaction takes place before the oil can be absorbed by the lime.

A more recent patent application (US 2005/0256359) indicates the possibility of using lime to reduce the toxicity of organic compounds, in particular by eliminating the halogens of toxic compounds, of the dioxin, furan or polychlorinated biphenyl type. Apart from its aforementioned role, lime acts as nucleophilic reactant, promoting the substitution of halogens with hydroxyl groups followed by oxidative degradation of the substituted molecules, in order to give organic molecules that are non-toxic or of low toxicity. Non-toxic organic compounds are preferably added so as to promote auto-ignition of the dispersed medium. In that document, only the "dehalogenation" yields—the intended objective—are specified, but not the possible levels of reduction of the organic substances.

Also known is a process for the treatment of divided metal residues contaminated by one or more organic compounds, in particular one or more hydrocarbons, comprising:

mixing, inside a chamber, of said metal residues with at least one calcium/magnesium compound capable of reacting exothermically with water;

exothermic reaction of said at least one calcium/magnesium compound with the water that the metal residues contain;

rise in temperature of the metal residues subject to an exothermic reaction; and dehydration of said metal residues during this exothermic reaction.

This process is described in Japanese Patent Application JP2000-237512. In particular, it proposes a method of dehydrating iron and steel residues intended to be reused as pig iron dephosphorizing agent. The product resulting from this treatment is considered to be handleable. One application case teaches that the addition of 20% quick lime by weight to the residues makes it possible to reduce the free oil content from 2.9% initially to 1.9% after treatment, the difference being absorbed by the lime. The authors propose using these treated residues containing partly absorbed oil as auxiliary material in steelmaking, where the oil will be burnt off, according to the authors, without a negative effect on the cast steel.

The patent EP1645645 describes a thermal treatment of steel plant sludges in a multi-stage furnace and the treated sludges at the exit of the furnace have a temperature between 700° C. and 800° C.

Finally, U.S. Pat. No. 4,326,883 describes a process for de-oiling and agglomerating mill scale. It consists of two steps:

PREPARATION: this essential step comprises the addition of quick lime to the mill scale, followed by intimate mixing, optionally in the presence of an addition of water, followed by agglomeration or balling (pelletization) of the mixture obtained, optionally by addition of additional water. The lime therefore serves as binder and dehydrating agent. The mixing step is considered to be critical. It must allow lime to extract the moisture, the oil and the fine mill scale particles, separating the latter from the coarse mill scale particles. The object is to ensure that most of the oil, initially contained in the mill scale, ends up in the surface layer of each pellet formed. To obtain this result, it is preferable to prescreen the mill scale. The preparation phase is completed by drying the pellets in an environment at a temperature below 345° C. This temperature is limited so as to prevent the pellets from being heated to a temperature above 120° C., which would cause them to explode. As a result, the pellets have a good compressive strength necessary for the next steps of the recycling process.

COMBUSTION: in this next step, the pellets are heated in an oxidizing atmosphere to a temperature sufficient to cause ignition and almost complete combustion of the oil contained in the pellets. The pellets advance as a moving bed from 2.5 to 7.5 cm in thickness so as to reside for from 0.5 minutes to 2 minutes in an atmosphere at between 815° C. and 1100° C., taking measures to ensure that the pellets do not exceed a temperature of 345° C. The importance of the above preparations step is reflected in the possibility of almost completely eliminating, in a very short time, the oil present on the surface of the pellets. This technique makes it possible to use the calorific value of the oil, so as to reduce the consumption of external fuel, which nevertheless remains substantial.

However, U.S. Pat. No. 4,326,883 is limited in its description and its examples to mill scale containing no more than 1% oil. This is because it is probably difficult, with higher oil contents, to produce pellets for which the oil will mainly be present as a surface layer, so as to allow flash combustion of the pellets in less than 2 minutes.

BRIEF SUMMARY OF THE INVENTION

To remedy the drawbacks of the aforementioned prior art, the invention provides a process and a device for the treatment of divided metal residues contaminated by organic compounds, which are simple and suitable for a wide range of contents of organic compounds and make it possible to limit to the strict minimum the supply of energy via external fuels, while still delivering a particularly valuable product that can be utilized.

To solve these problems, the invention provides a process that comprises the steps:
  mixing, inside a chamber, of said metal residues with at least one calcium/magnesium compound capable of reacting exothermically with water;
  exothermic reaction of said at least one calcium/magnesium compound with the water that the metal residues contain;
  rise in temperature of the metal residues subject to an exothermic reaction;
  dehydration of said metal residues during this exothermic reaction;
  oxidation of the organic compounds during said mixing, by bringing the metal residues contaminated by one or more organic compounds mixed with said at least one calcium/magnesium compound into contact with a gas stream containing at least partly oxygen; and
  removal from the chamber of a handleable and directly useable dehydrated treated product having a residual content of organic compounds of less than 1% by weight of said treated product.

The process is controlled so as to keep the treatment temperature, notably that of the gas stream, during the different steps below 600° C.

According to the invention, a calcium/magnesium compound is therefore added to the contaminated, divided metal residues in a chamber suitable for the heat treatments, which is swept with a gas stream and in which the entire treatment is carried out, and therefore preferably in a single step. No prior preparation or preconditioning of the materials to be treated, either of the calcium/magnesium compound or of the mixture thereof, is necessary. As in practice the residues often contain sufficient water, the process according to the invention does not in principle require any addition of water or even of additional reactants. The product leaving said chamber is dehydrated, easily handleable, directly useable or reclyclable, e.g. in a metallurgical or steelmaking process, and has a very low content of organic compounds. This product can then be utilized directly, especially in the industry from which the recovered metal originated.

The invention therefore proposes mainly a substantially autothermal process for eliminating organic compounds, particularly hydrocarbons, from contaminated metal residues, by means of a calcium/magnesium compound.

According to the invention, said at least one calcium/magnesium compound satisfies formula I:

$$x\text{CaO}.(1-x)\text{MgO} \qquad (I)$$

in which x is a molar fraction greater than 0 and equal to or less than 1.

This compound is preferably in the form of solid particles, mainly in oxide form. This calcium/magnesium compound may contain impurities, such as silica, alumina, iron oxide and calcium carbonate in an amount of a few per cent, and hydroxides corresponding to the oxides of the formula I.

One particular case of a calcium/magnesium compound is quick lime, corresponding to the case in which x is equal to 1 in formula I, which may also contain the aforementioned impurities and also a small amount of magnesium oxide.

Although it is possible in principle to start the oxidation reaction solely by the energy provided by the exothermic reaction between quick lime and water, it may be advantageous to furthermore supply the initial activation energy. According to one advantageous method of implementing the invention, the process therefore furthermore comprises:
  an initial supply of heat in order to promote onset of said exothermic reaction of the organic compounds contained in the metallic residues and to reach a predetermined temperature of the contaminated metal residues; and
  this supply is cut off when said predetermined temperature is reached, the process then being substantially autothermal in the steady state.

In the process according to the invention, a minimum amount of heat may be provided by any type of heating known per se, a priori most particularly or only in the onset phase. The predetermined temperature reached is then maintained essentially or completely by exothermic reactions that take place in the chamber.

The term "autothermal" means, within the context of the present invention, that the process no longer requires in principle a supply of external energy, it being possible for the reactions to be entirely controlled by adjusting the gas stream containing at least partly oxygen, the supply of metallic residues and the supply of calcium/magnesium compound.

Preferably, the residual content of organic compounds of the treated product is less then 0.5% by weight, advantageously less than 0.2% by weight and in particular less than 0.1% by weight.

During the treatment, the treatment of the metal residues advantageously takes place at a temperature of $\geqq 200°$ C. to $\leqq 600°$ C. Typically, the various conversions are carried out at temperatures from 300° C. to 550° C., thereby allowing the use of light solutions for protecting the walls of the treatment chamber, without requiring the use of refractory bricks. Apart from the inlets for the aforementioned materials, the chamber must allow the entry of fresh oxygen-containing gas, especially air, and the outlet for the hot gases, wherein the injection of fresh air may also be used to control the treatment temperature. A means of homogenizing the introduced materials ensures that the solid charge, consisting of said contaminated metal residues and said at least one calcium/magnesium compound, is continuously stirred and aerated. This charge may remain for about 0.25 h to 5 h, preferably 0.5 h to 2 h, in the treatment chamber so as to obtain the treated product.

The contaminated residues may preferably contain up to about 20% by weight, e.g. up to 15% by weight, of organic compounds and more than 20% by weight of water, for example up to 30% by weight. In general, they contain from 2% to 6% of organic compounds and 10% to 15% by weight of water.

The treated product is dehydrated and is in a powdery and easily handleable form and may even be able to be granulated by simply adding water.

The amount of calcium/magnesium compound added to the contaminated metal residues depends mainly on the amount of organic compounds, but also on the amount of water initially present in these residues. In general, the calcium/magnesium compound represents 5% to 35%, preferably 8% to 20%, often around 10% of the total mass of the aforementioned solid charge.

According to one particular method of implementing the invention, the process comprises a movement of said solid charge in the chamber during the mixing with supply of the gas stream countercurrently with the solid charge. The process advantageously includes, while the residues are being mixed and brought into contact with a gas stream, almost complete oxidation of the organic compounds, which are essentially converted to water and $CO_2$.

According to an improved method of implementing the invention, the process comprises recycling said treated product, preferably directly, into a metallurgical or steelmaking process, said treated product being substantially formed from possibly partly oxidized metal compounds and from said at least one hydrated and possibly also carbonated calcium/magnesium compound. The almost complete absence of residual organic compounds means that the product treated according to the invention can be recycled directly. In particular in the case of mill scale, this could be directly recycled into the ore sintering process carried out before the blast furnace. The presence of the calcium/magnesium compound is also beneficial in the aforementioned sintering process.

Other features of the process according to the invention are indicated in the appended claims.

The present invention also relates to an apparatus for the treatment of divided metal residues contaminated by organic compounds. This apparatus comprises a chamber, advantageously a heat-resistant chamber, which has:

at least one solids inlet via which said contaminated residues and at least one calcium/magnesium compound capable of exothermically reacting with water are introduced into the chamber;

at least one mixing element which mixes said contaminated residues and said at least one calcium/magnesium compound; and at least one solids outlet, via which a handleable, dehydrated, treated product is removed, which is directly useable or recyclable e.g. in a metallurgical or steelmaking process.

According to the invention, the chamber of this apparatus furthermore has:

at least one gas inlet for introducing a gas stream containing at least partly oxygen into the chamber; and at least one gas outlet, said treated product removed at said at least one solids outlet having a residual content of organic compound of less than 1% by weight of said treated product.

As already indicated above, an important advantage of such a device is the fact that it does not comprise refractory bricks.

According to one advantageous embodiment of the apparatus according to the invention, said at least one solids inlet is located at one end of the chamber and said at least one solids outlet is located at the opposite end of the chamber, the abovementioned metal residues mixed with said at least one calcium/magnesium compound being moved between said at least one inlet for solids and said at least one outlet for solids, and said at least one gas inlet and said at least one gas outlet are arranged in the chamber so that said gas stream passes countercurrently with the abovementioned mixed residues.

Advantageously, such an apparatus allows a continuous process to be carried out in one step. It would be possible for example to make use of a vertical multi-zone (multi-stage) chamber or a horizontal chamber, with separate feeds for the contaminated residues and for the calcium/magnesium. In this case, the first zone (feed zone), for example the upper stage of the chamber in the vertical version, serves for collecting the two feeds of solids and for continuously mixing them by means of a homogenization device. The feed stage also serves for preheating the solid charge by the hot gases escaping therefrom. The other zones or stages, located lower down, provide a sufficient residence time, while still aerating the material and circulating the gas flow, preferably countercurrently with the solids. It is thus possible to control the oxidation of the solids. The last zone or bottom stage, for outlet, is used in particular for preheating the gases by the solids and conversely cooling the latter by the fresh gas.

It is also possible to use a cylindrical chamber slightly inclined to the horizontal, with a gravity feed of the material, either by movement of the chamber with a stationary mixing device, or by movement of the mixing device in a stationary chamber, or by a combination of these two possibilities.

In such an apparatus according to the invention, the maximum temperature of the solid charge and of the gas stream does not exceed 600° C. and is typically between 200° C. and 550° C. The fresh gas, preferably flowing countercurrently, cools the solid charge before its exit from the chamber, while being heated upon contact with said charge. Similarly, the hot gases heat the solid charge in the stage where the two solids are fed and homogenized.

Surprisingly, it thus appears to be possible to carry out the treatment of contaminated residues into treated residues according to the invention with no or virtually no external heat supply, namely without the use of specific fuel, at least during steady-state operation. A supply of energy is possibly required only for an initial rise in temperature in the onset phase.

To achieve this result, it is necessary to make use of the heat generated by all of the exothermic reactions that take place during the treatment. This objective is achieved according to the invention in which the treatment process is carried out in a single step, in a single chamber.

The various exothermic reactions that take place in the treatment chamber are:
the slaking or hydration of the calcium/magnesium compound with the water present in the contaminated residues, namely the conversion of calcium oxide and/or magnesium oxide to the corresponding hydroxide;
the almost complete oxidation of most of the organic compounds, which are essentially converted to water and $CO_2$;
the carbonation of the calcium/magnesium compound; and possibly the at least partial oxidation of the metal compounds/contaminated residues into corresponding metal oxides.

Surprisingly, it appears that by controlling the conditions, in terms of residence time, aeration of the material and temperature, it is possible for the oxidation of the metal compounds, associated with the release of heat from the other reactions, to make the process autothermal, at least in the steady state.

Other features of the apparatus according to the invention are indicated in the appended claims.

BRIEF DESCRIPTION OF THE DRAWINGS

Other details and features of the invention will become apparent from the description given below by way of non-limiting example, with reference to the appended drawings.

DETAILED DESCRIPTION OF THE INVENTION

In the various figures, identical or similar elements are denoted by the same references.

Figure 1:
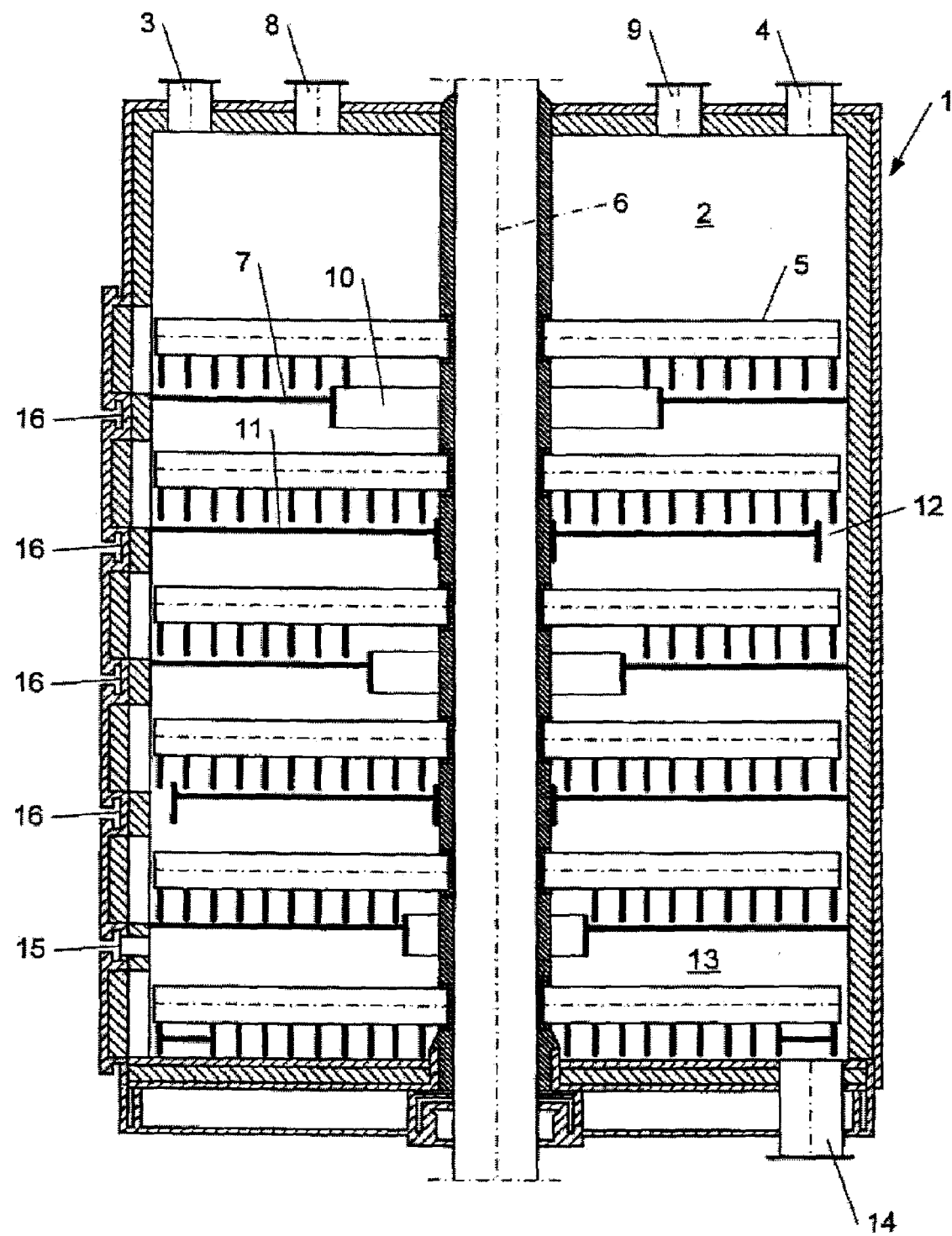
FIG. 1 shows a schematic sectional view of a treatment apparatus according to the invention.

A preferred apparatus for carrying out the process according to the invention is shown in FIG. 1 for the particular case of the treatment of steel mill scale.

The equipment illustrated in FIG. 1 consists of a multi-stage chamber 1 allowing treatment at temperatures ranging up to 600° C. This permits the use of a non-refractory technology, easy to carry out and inexpensive. This chamber is advantageously equipped with external burners (not shown) which supply heat, if necessary, namely if the temperature of the chamber drops below 300° C. The upper stage 2 (feed stage) is used for feeding the contaminated mill scale and the calcium/magnesium compound, preferably via two separate inlets 3 and 4. The feed stage 2 further includes a homogenizing means, preferably in the form of one or more rabble arms 5 rotating about a central shaft 6, mixing the solids that accumulate on the fixed hearth 7. It is also possible to provide one or more fixed rabble arms in the presence of a rotating hearth for the rabble arms and moving hearths, or a combination of these variants. In the example illustrated, two gas outlets 8 and 9 allow the ascending hot gases to be discharged, after heat exchange with the fed solids.

These preheated solids drop, by passing through a central hole 10, onto the hearth 11 of the underlying stage. During this cascade, exchange takes place between the gas flow and the solids. The hearth 11 is provided with one or more peripheral orifices 12 via which the mixed solids pass, through at least one further rabble arm, to the underlying stage. Similarly, the solids are conveyed by successive steps as far as the last stage (output stage 13), while being mixed with maximum exchange between the solids and the gas flow, in particular so as to promote the aforementioned oxidation reactions.

The output stage 13 serves in particular to preheat the fresh gas and cool the treated mill scale. In particular it comprises an outlet 14 for discharging this treated mill scale and a gas inlet 15 for introducing an oxygen-containing gas.

The number of stages of the apparatus depends mainly on the residence time needed for the fullest oxidation of the organic compounds initially present. Heated or unheated air may optionally be introduced as a supplement at each stage via the gas inlets 16.

Figure 2:
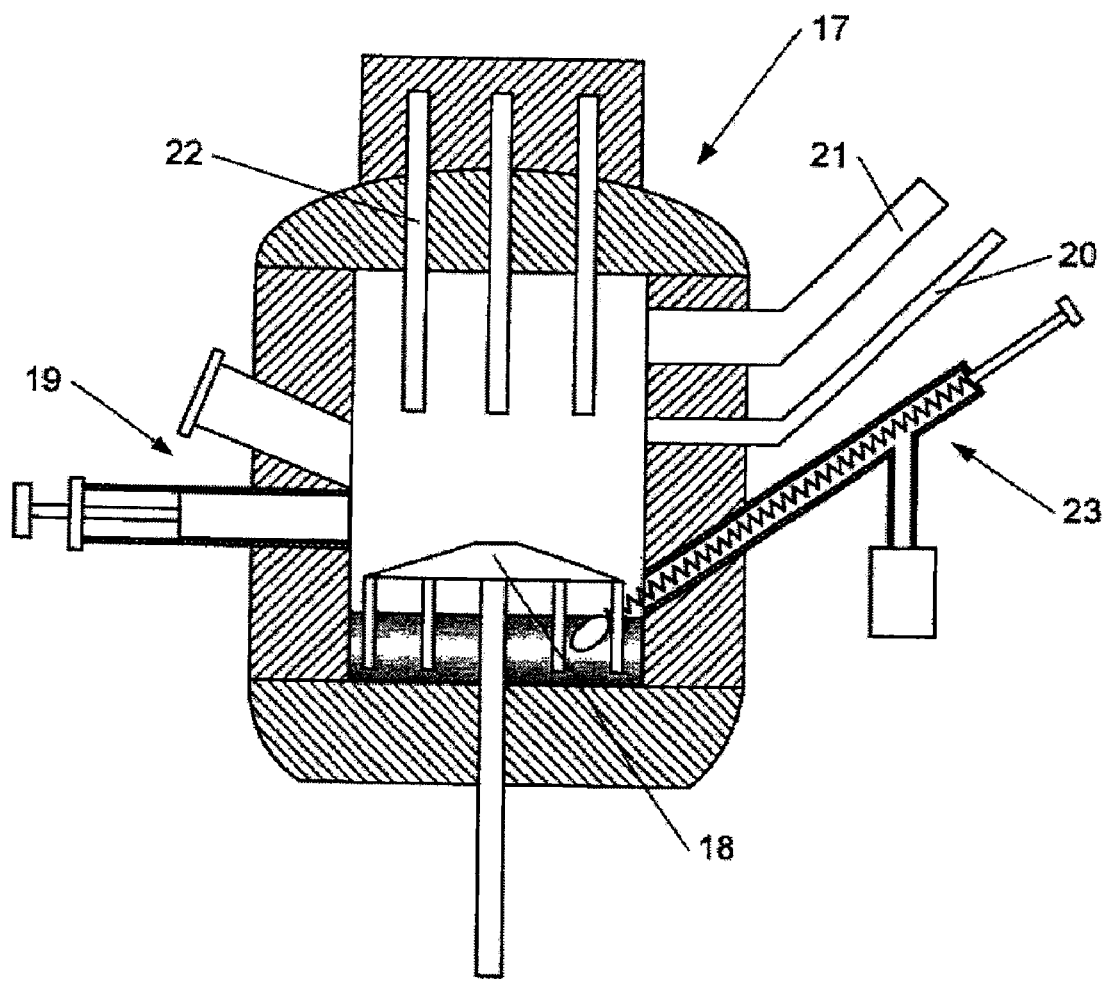
FIG. 2 shows a sectional view of one embodiment.

FIG. 2 shows a single-stage chamber 17, which can be heated by electrical heating elements 22, of cylindrical shape and equipped with a rabble arm 18 rotating at about 3 rpm. It is provided with equipment for introducing the solids 19, with an air inlet 20 and a gas outlet 21, and also with a pipe 23 for measuring the temperature of the solids and for removing samples.

In all the examples given below, rolling mill scale is treated with quick lime of industrial quality. The initial hydrocarbon content of the contaminated mill scale, or the final content of the treated mill scale, is determined by tetrahydrofuran extraction in a Soxhlet extractor followed by "Rotavapor" distillation. The contaminated mill scale is dried beforehand at 105° C. When the measured hydrocarbon content is less than 0.1%, it is considered that the treated mill scale is free of residual hydrocarbons.

In all cases the mill scale is treated in a pilot plant, such as that shown in FIG. 2, using a common operating method.

The operating conditions are the following:
preheating of the furnace to the predetermined initial temperature;
introduction of material, alternating between lime and mill scale;
continuous stirring of the mixture;
measurement of the temperature of the solids, so as to monitor the progress of the exothermic reactions;
removal of a sample at the end of the trial;
stopping of the reaction in the sample by contact with liquid nitrogen (oxygen-free cooling and atmosphere); and
measurement of the residual hydrocarbon content of the sample removed.

EXAMPLE 1

7.4 kg of mill scale containing 6% hydrocarbons by weight and 14% water by weight were treated in the pilot plant with 1.6 kg of lime, i.e. a lime supply of 18% by weight.

Two similar treatments were carried out by varying the initial treatment temperature; the first case at 200° C., the second at 300° C. In both cases, the treated product was pulverulent and easily handleable, and its residual hydrocarbon content was less than 0.1%.

At an initial temperature of 200° C., there was an induction period of about 1.5 h before significant release of heat by the oxidation reactions that make the operation autothermal. There was no external supply of heat after this moment. The maximum temperature of the solids was approximately 450° C. An overall residence time of about 3 h was needed to completely remove the hydrocarbons.

At 300° C. the induction period did not exceed 0.5 h. The maximum temperature of the solids was higher, slightly above 500° C. The residence time needed to oxidize all the hydrocarbons was less than 2 h.

This example shows the usefulness of having an external supply of heat so as to significantly reduce the induction period and thereby the overall residence time for complete oxidation of the hydrocarbons.

EXAMPLE 2

Mill scale contaminated with 1.7% hydrocarbons by weight and 14% water by weight was treated at an initial temperature of 300° C. An addition of quick lime of 18% by weight was used, i.e. 1.6 kg of lime per 7.5 kg of mill scale. The treated product was pulverulent and easily handleable, and its residual hydrocarbon content was less than 0.1%.

This experiment was compared with the second one of example 1, carried out under similar conditions (300° C. and 18% lime) but starting with mill scale more contaminated with hydrocarbons (6%).

When the initial hydrocarbon content was lower, the maximum temperature reached by the solids was lower, below 500° C., and this occurred after a shorter residence time, of less than 1.5 h.

EXAMPLE 3

The heat treatment of charges containing hydrocarbons generally results in the substantial emission of VOCs (volatile organic compounds). It was therefore useful to estimate the situation in the case of treatment according to the invention.

10 kg of mill scale containing 2.9% hydrocarbons by weight and 19% water by weight were treated at an initial temperature of 300° C. in the pilot plant of FIG. 2 with 2.5 kg of quick lime, i.e. a 20% by weight supply of lime. The treated product was pulverulent and easily handleable, and its residual hydrocarbon content was less than 0.1%.

Under the conditions of this experiment, an average VOC content of 1500 mg/Sm$^3$ in the gas discharge was observed if the carbon of the mill scale hydrocarbons was completely converted to VOCs. In fact, a VOC measurement during the experiment showed however a much lower average content of less than 60 mg/Sm$^3$. Thanks to this process for treatment with lime, the VOC emission was therefore about 25 times lower on average.

It should be understood that the present invention is in no way limited to the methods of implementation described above and that many modifications may be made thereto without thereby departing from the scope of the appended claims.

The invention claimed is:

1. Process for the treatment of divided metal residues contaminated by one or more organic compounds, comprising:
    mixing, inside a chamber, of said metal residues with at least one calcium/magnesium compound capable of reacting exothermically with water;
    exothermic reaction of said at least one calcium/magnesium compound with water that the metal residues contain;
    rise in temperature of the metal residues subject to an exothermic reaction;
    dehydration of said metal residues during this exothermic reaction;
    oxidation of the organic compounds during said mixing, by bringing the metal residues contaminated by one or more organic compounds mixed with said at least one calcium/magnesium compound into contact with a gas stream containing at least partly oxygen; and
    removal from the chamber of a handleable dehydrated treated product having a residual content of organic compounds of less than 1% by weight of said treated product, the process being controlled so as to keep the temperature of the gas stream below 600° C.

2. Process according to claim 1, wherein said at least one calcium/magnesium compound satisfies formula I:

$$xCaO.(1-x)MgO \qquad (I)$$

in which x is a molar fraction greater than 0 and equal to or less than 1.

3. Process according to claim 2, wherein the calcium/magnesium compound represents 5 to 35% of the total mass consisting of said metal residues and of the calcium/magnesium compound.

4. Process according to claim 1, wherein it furthermore comprises:
    an initial supply of heat in order to promote onset of said exothermic reaction and to reach a predetermined temperature of the contaminated metal residues; and
    this supply is cut off when said predetermined temperature is reached, the process then being autothermal in a steady state.

5. Process according to claim 1, wherein the residual content of organic compounds of the treated product is less than 0.5% by weight.

6. Process according to claim 1, wherein, during the mixing, the metal residues have a temperature of around 300° C. to 550° C.

7. Process according to claim 1, wherein the temperature of the gas stream is controlled by injection of air.

8. Process according to claim 1, wherein it comprises, during mixing, movement in the chamber of the metal residues mixed with said at least one calcium/magnesium compound with a supply of the abovementioned gas stream countercurrently with the metal residues.

9. Process according to claim 1, wherein the contaminated residues contain up to about 20% by weight of organic compounds and up to about 30% by weight of water.

10. Process according to claim 1, wherein, in the chamber, the metal residues are mixed with said at least one calcium/magnesium compound and brought into contact with said gas stream for a residence time of 0.25 h to 5 h.

11. Process according to claim 1, wherein it comprises recycling said treated product into a metallurgical or steelmaking process.

* * * * *